April 15, 1952     C. N. CONE     2,592,659

CHROMIUM-CELLULOSE ETHER MODIFIED PHENOLIC ADHESIVES

Filed April 25, 1949

```
AQUEOUS ALKALINE SOLUTION OF A THERMOSETTING
PHENOL-ALDEHYDE RESIN, E.G., A PHENOL-FORMALDEHYDE RESIN
          (200 PARTS BY WEIGHT SOLIDS BASIS)
                     |
        ADD FILLER, E.G., WALNUT SHELL FLOUR
                     |
                    MIX
                     |
ADD CHROMIUM COMPOUND SOLUBLE IN AQUEOUS ALKALINE
            MEDIA, E.G., SODIUM DICHROMATE
    (0.1-5.0 PARTS BY WEIGHT EXPRESSED AS CHROMIUM)
                     |
    ADD ALKALI DISPERSIBLE CELLULOSE ETHER, E.G.,
               METHYL CELLULOSE
            (0.1-10.0 PARTS BY WEIGHT)
                     |
                   BLEND
                     ↓
               FINISHED ADHESIVE
```

INVENTOR
CHARLES N. CONE

BY *Eugene D. Farley*

ATTORNEY

Patented Apr. 15, 1952

2,592,659

UNITED STATES PATENT OFFICE 2,592,659

CHROMIUM-CELLULOSE ETHER MODIFIED PHENOLIC ADHESIVES

Charles N. Cone, Portland, Oreg., assignor to United States Plywood Corporation, New York, N. Y., a corporation of New York Application April 25, 1949, Serial No. 89,554

14 Claims. (Cl. 260—14)

The present invention relates to thermosetting resinous adhesive compositions for use particularly in the manufacture of plywood by hot press methods. More specifically, the present invention relates to hot press plywood adhesives characterized by high tolerance to long assembly times, a high degree of extendability, and rapid setting in the press, which adhesives comprise phenol aldehyde resinous condensation products modified with an alkali soluble chromium compound, for example sodium chromate, and with an alkali-dispersible cellulose ether, for example methyl cellulose.

In making plywood, the press time characteristics of the adhesive employed and its tolerance to long assembly times are of primary significance in determining its successful application. By "press time" is meant the time required for the adhesive to transfer to the face veneers and set after it has been applied to the core veneers, the face veneers applied, and the assembly placed in the press and subjected to heat and pressure. By high tolerance to long assembly times is meant the ability to retain satisfactory potential adhesive characteristics in the interim period after application of the adhesive to the core veneers and before the actual pressing operation. In commercial plywood operations, it is usual practice to assemble from 16 to 40 panels and then to load them into the press. Since the panel assembling operation is time consuming, the adhesive must have a character such that, during the assembly period, it does not migrate away from the glue line, become excessively advanced, or otherwise be affected in such a manner as to prevent the formation of a strong bond between the plies during pressing.

Since the output of a plywood mill is a function of the capacity of its presses, it will be apparent that any reduction in press time will increase the amount of plywood produced in a given operating period and reduce correspondingly the cost of the product. In view of the fact that each press is loaded and unloaded many times during an operating day, the reduction of the press time by even a fraction of a minute is of commercial significance. Similarly, increasing the tolerance to assembly time of an adhesive, or retaining the high tolerance to long assembly times of a given adhesive while modifying its other properties, also is of commercial importance since it permits assembling the desired large number of panels over a substantial time period without impairing the effectiveness of the adhesive.

Although various expedients have been applied in an attempt to modify advantageously the press times and assembly time tolerances of the commercial thermosetting phenolic adhesives, these, if successful in securing the desired results, uniformly have affected disadvantageously one or more of the other properties of the adhesive mixture. For example, it is well known to advance the phenolic resin so that less time is required to effect its cure. However, advancing the resin substantially reduces its thermoplasticity with the result that it does not transfer well from the core veneer to the face veneers, especially at longer assembly times. Furthermore, the more highly advanced resins are quite viscous so that they do not spread readily on the core veneers. Hence it is necessary to dilute them with water to give them a spreadable consistency. The consequent reduction in solids increases the spreadability of the adhesive mixture, but since it is accomplished through the agency of added water, the tendency to form blisters and to delaminate is greatly increased.

Still further, attempts to reduce the press time of the adhesives by the expedient of advancing the resin content thereof have resulted in a significant reduction in the assembly time tolerance of the adhesive. Conversely, any attempt to improve the assembly time tolerance by using less advanced resins results in increasing the press time materially. Hence it will be apparent that any expedient by means of which either one of the above factors may be influenced favorably without unfavorably affecting the other, or by means of which both of the above factors may be influenced favorably, represents a significant achievement in the advancement of the plywood art.

I have discovered that the foregoing dilemma may be resolved and both the press time and the assembly time tolerance of the thermosetting phenolic resinous adhesives may be improved materially by the incorporation in the adhesive mixture of relatively minor proportions of a chromium compound of the class which is soluble in aqueous alkaline media such as are employed in the phenolic resin mixtures, together with a small amount of an alkali-dispersible cellulose ether, particularly methyl cellulose. When present in the adhesive mixture, these two materials cooperate to produce the desired result. The chromium compound serves as an accelerator which reduces the press time of the adhesive by as much as 20%. The tendency of the chromium compound to reduce the assembly time tolerance of the adhesive is offset by the presence of the cellulose ether. The latter substance increases the assembly time tolerance of the adhesives to a remarkable degree, this result being accomplished without affecting the press time adversely. Hence by using these two materials together, I am able to formulate phenolic adhesive mixtures which set rapidly and therefore are characterized by low press times, but which retain the necessary tolerance to long assembly periods.

The foregoing desirable result is achieved furthermore without impairment of any of the other necessary qualities of the adhesive mixture, and even, in fact, with significant improvement in some of these qualities. For example, the adhesive compositions of the present invention have a superior ability to hold in suspension walnut shell flour and other solid fillers and thus reduce the cost of the glue line without separation of the filler and consequent reduction in pot life. In addition, they have an improved working consistency. They spread readily on veneers to which they are applied, and once applied they tend to remain on the surface of the veneer rather than to sink into the wood. In the press, after the superimposition of the face veneers, they transfer readily to the latter so that an effective bond is formed on hot pressing.

In addition, the presently described adhesive compositions are applicable for use on relatively moist veneers, e. g. veneers having a moisture content of from 8 to 10%, without substantially increasing the hazard of blistering, and without the necessity of increasing the press time to compensate for the increased moisture content. As is well known, the conventional phenolic adhesives customarily are applied to veneers having a moisture content of but 2 to 3%. If this moisture content is increased materially, the tendency toward blister formation is relatively great and a corresponding increase in press time is required.

The accelerating action of chromium compounds upon the setting of the phenolic resinous adhesives is applicable broadly to such materials as a class. Suitable resinous adhesives therefore include those having as a resin base the resinous condensation products of the aldehydes with phenol, ortho cresol, meta cresol, para cresol, resorcinol, the xylenols, and the higher phenols. Also included are the resinous condensation products of the phenols with aldehydes other than formaldehyde, examples being acetaldehyde, furfural, the substituted furfurals, and the like. Also comprehended are the interpolymers of these materials and mixtures of the polymerized materials.

Although the phenol aldehyde resins may be employed in the solid state, as by dissolving or dispersing them in alkaline solutions, it is preferred to employ them in the form of the alkaline dispersions which are commercially available, usually as dispersions containing about 40% by weight of phenol aldehyde resin and having a pH of about 10 or 12. In view of the accelerating effect of the added chromium compound, the resins may be used in a relatively low state of advancement.

As indicated above, the chromium compounds which are at least in some measure soluble in aqueous alkali media, termed herein "alkali-soluble chromium compounds," are applicable broadly as a group for the purposes of the present invention. Suitable chromium compounds therefore include those in which chromium appears in any of its valence states either as a cation or as an anion. Representative chromic compounds comprise chromic oxide, chromic nitrate, chromic hydroxide, chromic chloride, chromic sulfate, potassium chromium sulfate (chrome alum) and the like. Also suitable is a chrome solution similar to that used in tanning and prepared by reducing in aqueous alkaline medium a dichromate such as sodium dichromate with a suitable reducing agent, the procedure therefor being set forth in detail in the examples hereinbelow. The chromous compounds are the full equivalent of the chromic compounds for the purposes of the invention, since under ordinary conditions they are spontaneously oxidized to chromic compounds. As is well known to one skilled in the art, the foregoing water soluble chromic compounds in alkaline solutions such as comprise the media for the resinous phenolic adhesives are converted in greater or lesser degree to soluble chromites.

Further suitable for the purposes of the present invention are the compounds of chromium in which the chromium is hexavalent. These include chromium trioxide (chromic anhydride), chromic acid, dichromic acid, sodium chromate, potassium chromate, ammonium chromate, sodium ammonium chromate, potasium ammonium chromate, sodium dichromate, potassium dichromate, ammonium dichromate, sodium ammonium dichromate, potassium ammonium dichromate, and the like. These compounds, if not already in such state, tend to be converted to chromates in the aqueous alkaline resinous adhesive mixtures by well known reactions.

The cellulose ethers which are suitable for the purpose of the present invention are, in general, those which are dispersible in aqueous alkaline media and which therefore are compatible with water base phenolic adhesives. They include, for example, methyl cellulose, methyl propyl cellulose, methyl ethyl cellulose, and the like. These materials as a class may be prepared by treating purified cotton or wood cellulose with a strong alkali such as caustic soda to form alkali cellulose. The latter then is reacted at high temperatures under pressure with an alkyl halide. Methyl cellulose, for example, is made by treating cellulose with caustic soda, and reacting the resulting alkali cellulose with methyl chloride under elevated temperatures and pressures. This forms an etherified product containing approximately two methyl groups per anhydroglucose residue in the cellulose chain. The methoxyl content of the product varies from 29 to 32%.

Methyl cellulose is a preferred cellulose ether for use in the preparation of the adhesive compositions described herein. It is available commercially in viscosity types ranging from 10 to 4000 centipoises, these values being the viscosities of 2% by weight aqueous solutions at 20° C. It is preferred to use the 1000 to 4000 cp. viscosity types, since when using the types of lower viscosity it is necessary to use them in relatively very large proportions to produce an equivalent effect.

I have found further that the concentration of the cellulose ether dispersion employed has a significant influence on its effectiveness in imparting the foregoing qualities to the adhesive compositions in which it is contained. In general, as the concentration of the dispersion increases, its effectiveness decreases rapidly, so that a cellulose ether in a dispersion of medium concentration must be used in substantially greater quantity than when used in a dispersion of lower concentration, to produce the same result. Hence for the purposes of the present invention it is preferred to employ the cellulose ether of the higher viscosity types in relatively dilute aqueous solutions, i. e. in solutions containing from about 0.5% to about 4.0% by weight cellulose ether.

Other materials which may be admixed with the phenol aldehyde resin and the alkali soluble chromium compound in formulating my herein described adhesive compositions include an alkaline material, water, and solid fillers. The alkaline material serves to dissolve the phenolic resin, to dissolve the chromium compound if the latter already is not in solution, to promote the dispersion of the solid filler in the mixture and form a blend of uniform composition, and to catalyze the setting of the resin to form the final bond. Suitable alkaline materials comprise particularly the basic acting compounds of the alkali metals, for example the alkali metal hydroxides, mixtures thereof, and substances such as sodium carbonate which in solution hydrolize to form an alkali metal hydroxide. These are used in amounts sufficient to accomplish the above purposes, this amount being defined herein as "a solubilizing quantity," since in general the amount of alkaline material which is sufficient to dissolve the phenolic resin and the chromium compound and to form a uniform blend will be sufficient also to catalyze the reaction. Where water soluble chromates and dichromates, and the commercial alkaline water base phenolic resins having a pH of from about pH 11 to about pH 12 are employed, it usually is not necessary to add a further quantity of alkali. However, with certain compositions, particularly those which are highly extended with solid fillers, additional amounts of alkaline material may be added as required to provide a uniform blend of desired viscosity and spreading qualities.

In addition, solid fillers such as walnut shell flour, wood flour, clay, etc., may be added in the amount calculated to secure the desired extension of the phenolic resins. Water may be added as necessary to produce a spreading viscosity and to secure further extension of the resin, not enough being added, however, to induce the formation of blisters during pressing.

The relative proportions of phenol aldehyde resin, chromium compound, and cellulose ether to be used in formulating the herein described adhesive composition are variable depending upon the adhesive specifications it is desired to meet. In general, the accelerating effect of the chromium compound is roughly proportional to the amount in which it is used, the greater the amount, the greater being the accelerating effect. Hence the addition of even a relatively minor proportion of the chromium compound may be advantageous. The upper limit of its use is determined to a large extent by the sensitivity of the phenolic resin to its action. Any amount may be used up to the point where the resin sets so rapidly as to be inapplicable in the pressing operation contemplated, or where its bonding action is destroyed. Such an amount is termed herein "an accelerating quantity."

The amount of cellulose ether employed preferably is coordinated with the quantity of chromium compound used, a sufficient amount of cellulose ether being used to overcome the tendency of the chromium compound to shorten the assembly time tolerance of the adhesive mixture. Thus in the usual case, an amount of chromium compound may be used which is calculated to shorten the press time by the desired amount. Then a sufficient quantity of cellulose ether, e. g. methyl cellulose is added to maintain the assembly time tolerance at the desired level, due allowance being made also for maintaining a spreading viscosity and a desired content of solid filler and water.

In general, therefore, the herein described adhesive compositions contain from about 0.1 part to about 5.0 parts by weight (expressed as chromium) of chromium compound and from about 0.1 part to about 10.0 parts by weight (solids basis) of cellulose ether for each 200 parts by weight (solids basis) of phenol aldehyde resin. Walnut shell flour or other solid filler, water, and alkali are added as necessary or desirable. A preferred range of proportions of these constituents, and a specific formulation are given in Table I, wherein parts are expressed as parts by weight.

TABLE I

|  | Preferred Range | Specific Formulation |
| --- | --- | --- |
| Phenol Aldehyde Resin (Solids basis). | 200 | 200. |
| Chromium Compound (Expressed as chromium). | 0.1–5.0 | 0.7. |
| Cellulose Ether (Solids basis) | 0.1–10.0 | 0.6. |
| Solid Filler (e. g. walnut shell flour). | 20 to 200 | 80. |
| Water | 200 to 1,000 | 400. |
| Alkali | Solubilizing Quantity. | Solubilizing Quantity. |

The adhesive compositions of the invention may be formulated from the foregoing constituents by introducing them in the predetermined amounts in a mixer or other vessel provided with suitable agitating means. They then are stirred or mixed, preferably at room temperature, until a blend of uniform composition and consistency is obtained. Although the constituents may be variously added to each other in order to produce the final composition, it is preferred to add the chromium compound as a relatively dilute aqueous solution at normal room temperature to the aqueous solution of the phenolic resin. If the chromium compound is added as a solid or in concentrated solution, or at elevated temperatures, its activity is so great as to cause localized curing of the resin in the adhesive mixture. This effect does not appear harmful if it does not occur to an excessive degree. However, for obvious reasons, it is not desirable to cure the resin until it cannot be applied to the veneers in conventional equipment, or until it will not set further upon the application of heat and pressure in the presses.

Also, if it is desired to incorporate in the final mixture an amount of alkali greater than that normally present in the commercial water base phenolic resins, as may be the case where large amounts of solid fillers are to be incorporated in the mixture, the additional alkali should not be added directly to the cellulose ether. If this is done, as where (1) the alkali is mixed with the cellulose ether prior to the addition of the phenol aldehyde resin or (2) the three materials are added together and mixed simultaneously, or (3) it is attempted to formulate the composition directly from the ultimate raw materials (i. e. by polymerizing the phenol and the aldehyde in the presence of the cellulose ether and a substantial amount of an alkaline material), the alkaline material apparently reacts preferentially with the cellulose ether, destroying its advantageous properties insofar as the purposes of the present invention are concerned. However, if the reacted phenol aldehyde resin is admixed with the cellulose ether prior to the addition of further quantities of alkaline material, the resin appears to act as a buffer, tying up the cellulose ether so that an alkaline material may subsequently be added in substantial amount as required to produce the desired blending effect, without interfering with the desired combination of cellulose ether and phenol aldehyde resin.

Thus a typical method of formulating the herein described adhesive compositions comprises dissolving the chromium compound in water, or in the aqueous cellulose ether solution, mixing the aqueous solutions of chromium and cellulose ether with the phenol aldehyde resin, and then adding the solid filler, additional alkali, and added water as desired followed by thorough agitation to form a uniform blend. The mixing operation may be effected in conventional equipment and preferably is carried out at normal room temperature with cooling if necessary and with sufficient speed to prevent the formation of localized concentrations of chromium compound. This might result in the over-advancement of part of the resin and the formation of a solid precipitate in the adhesive mixture as explained above.

The chromium-cellulose ether modified phenolic adhesives and their method of formulation and application are illustrated further in the following examples where parts are expressed as parts by weight.

Example 1

500 parts of 40% by weight aqueous alkaline phenol formaldehyde resin was placed in a mixer together with 80 parts walnut shell flour. The two constituents were stirred vigorously for three minutes. 2 parts sodium dichromate dissolved in 60 parts of a 1% by weight aqueous solution of methyl cellulose (4000 centipoises viscosity grade) next was added and the mixing continued. An additional 50 parts water then was added with continued stirring, after which the composition was ready for use.

The adhesive composition prepared as indicated above was applied to the production of 5-ply $\frac{13}{16}$ inch. Douglas fir plywood panels in the customary manner, but using a press time of 7 minutes. Satisfactory bonding was obtained at this press time, and the panels produced conformed to exterior grade plywood specifications.

In a manner similar to the foregoing, resinous adhesive compositions are prepared and applied using in place of the phenol formaldehyde resin, a cresol formaldehyde resin or a resorcinol formaldehyde resin; using in place of the sodium dichromate potassium dichromate, ammonium dichromate, sodium chromate, potassium chromate, or ammonium chromate; and using in place of the methyl cellulose solution a solution of methyl propyl cellulose.

Example 2

2 parts sodium dichromate was dissolved in 80 parts of a 2% aqueous solution of methyl cellulose having a viscosity of 4000 centipoises. The resulting solution together with 120 parts water and 100 parts walnut shell flour were placed in a mixer and vigorously mixed until the walnut shell flour particles were thoroughly wetted. To the resulting mixture was added 200 parts phenol formaldehyde resin solution having a solids content of about 40% by weight and a pH of about 11.5. The composition again was mixed thoroughly. Then 30 parts caustic soda dissolved in 30 parts water was added followed by another mixing period. Next to the resulting mixture was added 300 parts phenol formaldehyde resin solution together with 30 parts clay. The resulting mixture then was mixed to uniform consistency.

The highly extended resin prepared as set forth above was applied to the fabrication of plywood panels as described in Example 1. Satisfactory bonding was obtained at the same short press time, and the panels produced conformed to exterior grade plywood specifications.

Example 3

An accelerated phenolic composition was prepared containing the following constituents, the procedure followed being substantially the same as that set forth in Example 1, except that, after mixing of the other ingredients, 5 parts sodium hydroxide dissolved in 50 parts water was added to improve the viscosity of this mixture.

| | Parts by weight |
|---|---|
| Phenol formaldehyde resin (40% solids) | 500 |
| Walnut shell flour | 80 |
| Chromic chloride ($CrCl_3.6H_2O$) | 4 |
| Methyl cellulose (1% solution; 4000 cp. grade) | 60 |
| Sodium hydroxide | 5 |
| Water | 50 |

As in the case of the preceding examples, the composition of this example was applied satisfactorily to the fabrication of exterior grade $\frac{13}{16}$ inch 5-ply Douglas fir panels using press times of as little as 7 minutes at 285° F. and 175 pounds per square inch. Furthermore, the compositions were characterized by satisfactory spreading viscosities and assembly time tolerances.

Hence it will be apparent that, by the present invention, I have provided rapid setting phenolic adhesive compositions which cure in the press much more rapidly than do the conventional phenolic adhesives, thus enabling a substantial increase in production with given press installations.

Furthermore, this decreased press time is obtained while still retaining the necessary degree of tolerance to long assembly periods as well as the desirable qualities of transfer and spreadability which are required of the adhesives in the usual applications. The formulation of the adhesives and their application in plywood manufacture may be carried out in conventional equipment and without increased hazard of blister formation in the presses. Also, the adhesives may be extended to an unusual degree with water and with solid fillers. These advantages are obtained without sacrificing any of the qualities requisite to the formulation of an adhesive for use in the hot press manufacture of exterior grade plywood.

Having now described my invention in preferred embodiments, I claim as new and desire to protect by Letters Patent:

1. An adhesive composition comprising a thermosetting phenol formaldehyde resinous condensation product, a chromium compound soluble in aqueous alkaline media, and an alkali dispersible cellulose ether, the constituents being employed in the relative proportions of between about 0.1 and about 5.0 parts chromium compound, expressed as chromium, and between about 0.1 and about 10.0 parts cellulose ether for each 200 parts phenol formaldehyde resinous condensation product, parts being expressed as parts by weight on a solids basis.

2. An adhesive composition comprising a thermosetting phenol aldehyde resinous condensation product, a chromic compound soluble in aqueous alkaline media, and an alkali dispersible cellulose ether, the constituents being employed in the relative proportions of between about 0.1 and about 5.0 parts chromic compound, expressed as chromium, and between about 0.1 and about 10.0 parts cellulose ether, for each 200 parts phenol aldehyde resinous condensation products, parts being expressed as parts by weight on a solids basis.

3. An adhesive composition comprising a thermosetting phenol aldehyde resinous condensation product, a chromate compound soluble in aqueous alkaline media, and an alkali dispersible cellulose ether, the constituents being employed in the relative proportions of between about 0.1 and about 5.0 parts chromate compound, expressed as chromium, and between about 0.1 and about 10.0 parts cellulose ether, for each 200 parts phenol aldehyde resinous condensation products, parts being expressed as parts by weight on a solids basis.

4. An adhesive composition comprising a thermosetting phenol formaldehyde resinous condensation product, potassium dichromate, and an alkali dispersible cellulose ether, the constituents being employed in the relative proportions of between about 0.1 and about 5.0 parts potassium dichromate, expressed as chromium, and between about 0.1 and about 10.0 parts cellulose ether for each 200 parts phenol formaldehyde resinous condensation product, parts being expressed as parts by weight on a solids basis.

5. An adhesive composition comprising a thermosetting phenol aldehyde resinous condensation product, a chromium compound soluble in aqueous alkaline media, and methyl cellulose, the constituents being employed in the relative proportions of between about 0.1 and about 5.0 parts chromium compound, expressed as chromium, and between about 0.1 and about 10.0 parts methyl cellulose, for each 200 parts phenol aldehyde resinous condensation products, parts being expressed as parts by weight on a solids basis.

6. A rapid setting plywood adhesive having high tolerance to long assembly times which comprises a thermosetting resinous phenol formaldehyde condensation product, methyl cellulose, and a water soluble dichromate, the constituents being employed in the relative proportions of between about 0.1 and about 5.0 parts water soluble dichromate, expressed as chromium, and between about 0.1 and about 10.0 parts methyl cellulose for each 200 parts resinous phenol formaldehyde condensation product, parts being expressed as parts by weight on a solids basis.

7. A rapid setting plywood adhesive having high tolerance to long assembly times which comprises about 200 parts of a thermosetting resinous phenol aldehyde condensation product, from about 0.1 part to about 5.0 parts of a chromium compound soluble in aqueous alkaline media, expressed as chromium, and from about 0.1 part to about 10.0 parts of an alkali dispersible cellulose ether, parts being expressed as parts by weight.

8. A rapid setting plywood adhesive having high tolerance to long assembly times which comprises about 200 parts of a thermosetting resinous phenol formaldehyde condensation product, from about 0.1 part to about 5.0 parts of a chromium compound soluble in aqueous alkaline media, expressed as chromium, and from about 0.1 part to about 10.0 parts of methyl cellulose, parts being expressed as parts by weight.

9. A rapid setting plywood adhesive having high tolerance to long assembly times which comprises about 200 parts of a thermosetting phenol formaldehyde resinous condensation product, from about 0.1 part to about 5.0 parts of a water soluble chromate, expressed as chromium, and from about 0.1 part to about 10.0 parts of methyl cellulose, parts being expressed as parts by weight.

10. A rapid setting adhesive composition having substantially the following formula, wherein parts are expressed as parts by weight.

| | |
|---|---|
| Thermosetting phenol aldehyde resin solids basis | 200 |
| Chromium compound soluble in aqueous alkaline media, expressed as chromium | 0.1–5.0 |
| Cellulose ether solids basis | 0.1–10.0 |
| Solid filler, e. g. walnut shell flour | 20–200 |
| Water | 200–1000 |
| Alkali | Solubilizing quantity |

11. A rapid setting adhesive composition having substantially the following formula, wherein parts are expressed as parts by weight.

| | |
|---|---|
| Thermosetting phenol formaldehyde resin solids basis | 200 |
| Chromium compound soluble in aqueous alkaline media, expressed as chromium | 0.1–5.0 |
| Methyl cellulose solids basis | 0.1–10.0 |
| Solid filler, e. g. walnut shell flour | 20–200 |
| Water | 200–1000 |
| Alkali | Solubilizing quantity |

12. A rapid setting adhesive composition comprising:

| | Parts by weight |
|---|---|
| Thermosetting phenol formaldehyde resin solids basis | 200 |
| Water soluble chromate expressed as chromium | 0.7 |
| Methyl cellulose solids basis | 0.6 |
| Solid filler, e. g. walnut shell flour | 80 |
| Water | 400 |
| Alkali | Solubilizing quantity |

13. A rapid setting plywood adhesive having high tolerance to long assembly times which comprises an aqueous thermosetting resinous phenol-aldehyde resinous condensation product having a pH of at least about 10, a chromium compound soluble in aqueous alkaline media, and an alkali dispersible cellulose ether, the constituents being employed in the relative proportions of between about 0.1 and about 6.0 parts chromium compound, expressed as chromium, and between about 0.1 and about 10.0 parts cellulose ether for each 200 parts phenol-aldehyde resinous condensation product, parts being expressed as parts by weight on a solids basis.

14. An adhesive composition comprising a thermosetting, phenol-formaldehyde resinous condensation product, sodium dichromate, and methyl cellulose, the constituents being employed in the relative proportions of between about 0.1 and about 5.0 parts sodium dichromate, expressed as chromium, and between about 0.1 and about 10.0 parts methyl cellulose for each 200 parts phenol-formaldehyde resinous condensation product, parts being expressed as parts by weight on a solids basis.

CHARLES N. CONE.

REFERENCES CITED

The following references are of record in the file of this patent:

UNITED STATES PATENTS

| Number | Name | Date |
|---|---|---|
| 2,462,253 | Booty | Feb. 22, 1949 |

FOREIGN PATENTS

| Number | Country | Date |
|---|---|---|
| 16,896 | Australia | Dec. 3, 1929 |